United States Patent

[11] 3,550,782

[72] Inventor Louis P. Veloz
500 S. Madison, Pasadena, Calif. 91106
[21] Appl. No. 727,772
[22] Filed May 9, 1968
[45] Patented Dec. 29, 1970

[54] WATER STERILIZER APPARATUS
9 Claims, 4 Drawing Figs.

[52] U.S. Cl. .................................................. 210/192,
210/257, 210/321; 21/102; 210/259
[51] Int. Cl. ....................................................... B01d 57/00;
C02 3/00
[50] Field of Search ........................................... 21/54, 102;
210/63, 23, 22, 259, 321, 257, 192

[56] References Cited
UNITED STATES PATENTS
3,092,503  6/1963  Gray ............................. 21/102X
3,268,441  8/1966  Lindstrom ..................... 210/22
3,276,458  10/1966 Iversen et al. .................. 210/259X
3,336,099  8/1967  Czulak et al. .................. 210/63X
3,421,836  1/1969  Sundin et al. .................. 21/102X Primary Examiner—Samih N. Zaharna
Attorney—William P. Green ABSTRACT: A pair of parallel quartz tubes extend through a housing. The tubes are connected in a water purification system in which water from a faucet to a reverse osmosis unit moves through one quartz tube, and water from the reverse osmosis unit moves through the other tube to a water tank. A string of ultraviolet lamps is located between the tubes so as to sterilize the water in both tubes. Also, air enters the housing through air filters, and the lamps produce ozone which is directed to the top of the water tank through an air line.

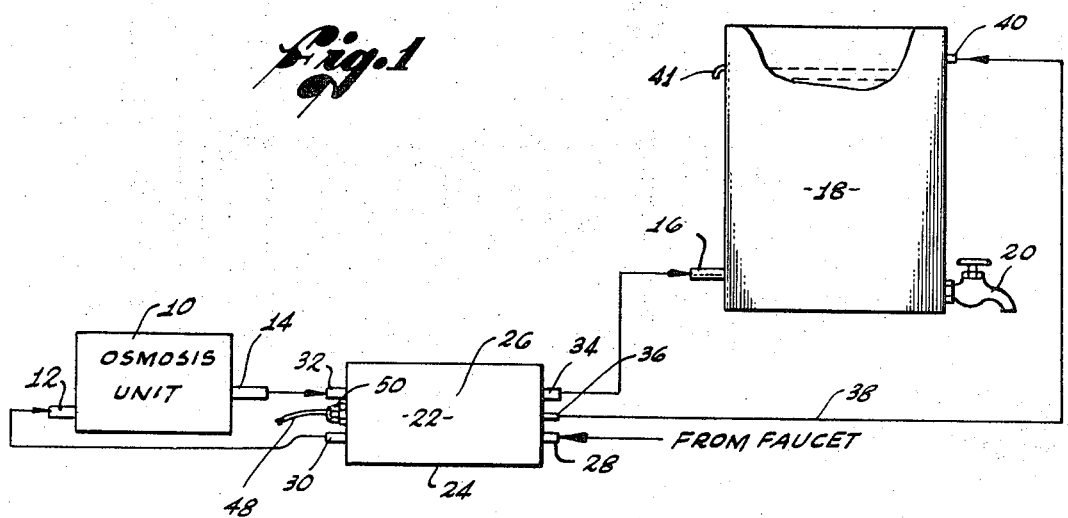
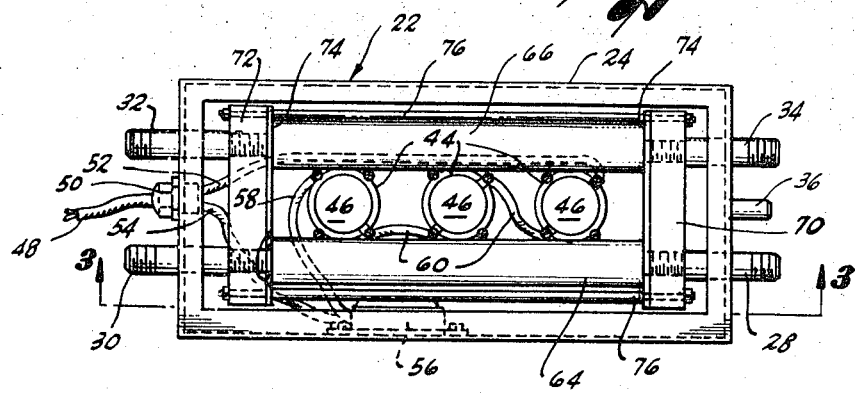
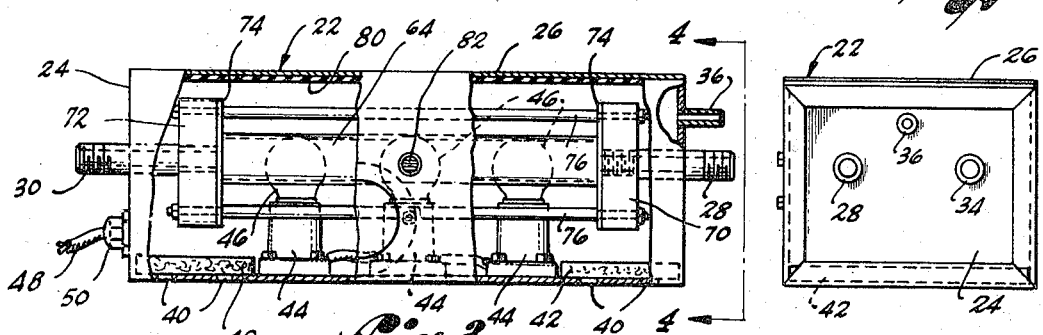
INVENTOR.
LOUIS P. VELOZ
BY
Perry E. Turner
ATTORNEY

3,550,782

WATER STERILIZER APPARATUS

BACKGROUND OF THE INVENTION

1. Field of the Invention

This invention relates to water purification systems, and more particularly to novel apparatus which facilitates production of sterilized and ozonated drinking water.

2. Description of the Prior Art

Considerable time, effort and expense have been devoted to the development of water purification systems for home use which use so-called reverse osmosis devices. Such a device which includes means for removing minerals and bacteria from water entering therein, is connected between the cold water faucet and a tank. Depending upon whether air in the top of the tank is trapped or the tank has an opening to admit air therein, the system is designated as a closed system or an open system. The tank has an outlet valve or faucet from which one can obtain a supply of the purified water. When a supply of water is drawn from the tank, it is replenished by filtered water from the reverse osmosis unit. Movement of water is quite slow, e.g. of the order of 2 drops per second.

A disadvantage of both open and closed systems as heretofore known is that there has been no practical and economically feasible means for insuring that all water produced thereby is sterilized. In this connection, an occasional reverse osmosis unit does not satisfactorily remove bacteria from water entering it. Also, there is the disadvantage that parts (nipples, pipes) connecting the reverse osmosis unit to the tank contain considerable bacteria which enters the filtered water passing from the reverse osmosis unit to the tank. There has heretofore been no simple, inexpensive means for destroying such bacteria.

Another disadvantage of the prior art developments is that the purified water produced thereby does not taste good. It is known that water from which minerals are removed has a flat taste. It is for this reason that in plants which bottle purified water, it is customary to ozonate the water. For this purpose, elaborate equipment is employed to produce ozone and mix it with the purified water preparatory to bottling. However, in the development of water purification systems for home use, apparatus of conveniently small size and expense for automatically ozonating filtered water has not been known.

SUMMARY OF THE INVENTION

The invention embraces means for sterilizing two streams of water from a single source of ultraviolet light, whereby in a system using a reverse osmosis unit, bacteria in water entering and leaving the unit are destroyed. Such means provides either a closed system or an open system in which water entering the tank is freer of bacteria than is possible with any prior art system. Additionally, this invention embraces means utilizing the same ultraviolet light source to produce ozone and ozonate purified water in the tank of an open system.

BRIEF DESCRIPTION OF THE DRAWING

FIG. 1 is a block diagram of a water purification system for home use and apparatus for destroying bacteria and for ozonating the drinking water, all in accordance with my invention;

FIG. 2 is a longitudinal top plan view of my water sterilizer and ozone producing apparatus, with the cover removed;

FIG. 3 is a sectional view taken along the line 3—3 of FIG. 2; and

FIG. 4 is an end elevation view taken along the line 4—4 of FIG. 3.

DESCRIPTION OF PREFERRED EMBODIMENTS

Referring to FIG. 1, there is shown a water purification system comprising a reverse osmosis unit 10 having an inlet pipe nipple 12 through which water from a faucet is to be directed, and an outlet pipe nipple 14 from which a fluid line is connected to the inlet nipple 16 of a tank 18. As shown, the tank 18 has an outlet faucet 20 from which the purified water can be drawn therefrom.

Included in such system is novel water sterilizing and ozone producing apparatus 22, which comprises a housing 24 having a top cover 26, which has an inlet nipple 28 for connection to a fluid line from a faucet, an outlet nipple 30 from which a fluid line is connected to the nipple 12 of the reverse osmosis unit 10, an inlet nipple 32 for connection of a fluid line from the nipple 14 of the unit 10, and an outlet nipple 34 for connection of a fluid line to the nipple 16 to the tank 18. Also, the housing 24 is provided with a tubular pipe or fitting 36 extending into the interior thereof, and from which an air line connection, indicated at 38, is made to an opening in the top of the tank 18, as to a nipple 39. The tank has a check valve and an overflow fitting 41, whereby to establish the maximum level of water in the tank.

In the operation of the system of FIG. 1, water from the faucet that passes from the inlet pipe 28 through the outlet pipe 30 is sterilized, as is water passing from the inlet pipe 32 through the outlet pipe 34. Also, ozone is produced in the apparatus 22, and is directed through the nipple 39 into the top of the tank 18. Thus, bacteria present in the water from the faucet is destroyed before reaching the reverse osmosis unit 10; bacteria that enters the water between the reverse osmosis unit 10 and tank 18 is destroyed before reaching the tank; and ozone created in the top of the tank 18 provides a blanket of sterile air over the water, and also is dissolved to some extent into the water to render it more palatable.

Referring to FIGS. 2—4, my apparatus for producing these distinct advantages is quite small and compact. The housing 24 in which such apparatus is located may be of the order of one foot in length, 4½ inches wide, and 4 inches high.

The floor of the housing has its end portions perforated, as at 40, to provide a plurality of openings through which to admit air into the interior of the housing. Overlaying the perforations 40, and extending the width of the housing, are filter pads 42. The housing is otherwise airtight. The function of these filters is to eliminate particles greater than a predetermined size, e.g., 1 micron, from air entering the housing.

Between the filter elements 42, the unperforated portion of the floor of the housing supports the lamp bases or sockets 44 of a number of ultraviolet lamps 46, which via suitable connections are connected in series. For this purpose in the example shown, a power cord 48 extends into the housing through an insulating fitting 50, such as a raintight fitting. One wire 52 from the cord 48 is connected to the base at one end of the string of lamps, and the other wire 54 from the cord 48 is connected to a ballast 56 for the lamps. Via a connection 58 from the ballast 56 to the lamp base at the other end of the string, and appropriate connections 60 between adjacent lamps, the lamps are connected in series when the cord 48 is plugged into a wall socket.

As shown, the ballast 56 is secured to the inner surface of one sidewall of the housing 24. However, it will be apparent that my invention does not require that the ballast be placed inside the housing. It will suffice to merely connect the lamp bases 44 in series between the wires of the cord 48, and to connect the cord to an external ballast, or to a plug for connection for such external ballast.

The bulbs of the lamps 46 are located between two parallel quartz tubes 64, 66. One tube 64 extends between the nipples 28, 30, so that water entering the nipple 28 from the faucet passes through the quartz tube 64 and out of the nipple 30 to the reverse osmosis unit. Thus, water passing through the quartz tube 64 is exposed to ultraviolet radiation from the lamps 46, whereby bacteria in the water is destroyed. Such destruction of bacteria upstream of the reverse osmosis unit is especially desirable in order to protect the membrane of the reverse osmosis unit against accumulation thereon of live bacteria, which bacteria if present will reproduce and form a slime on the membrane preventing or resisting flow of water therethrough.

In similar fashion, the quartz tube 66 extends between the nipples 32, 34, so that water passing through the tube 66 between the reverse osmosis unit and the tank 18 is also exposed to ultraviolet radiation, and the bacteria therein destroyed.

In this connection, attention is directed to the fact of the very slow trickle of filtered water into the tank 18. Since the water does move so slowly, all the water is exposed to ultraviolet radiation for a considerable period of time, e.g., of the order of several minutes in passing through each quartz tube. I have found that the desired sterilization is accomplished with the use of quartz tubes which are about 9 inches in length. Of course, if desired, much longer quartz tubes can be employed, and a greater number of ultraviolet lamps than the three shown can be used commensurate with the longer lengths of quartz tubes.

The above-described arrangement has the advantage that a single source of ultraviolet radiation functions to sterilize two streams of water. Further, it can be connected in the manner described to provide an improved system of either the open type or closed type.

As best seen in FIGS. 2 and 3, the nipples 28, 34 are threaded through a support block 70, and the nipples 30, 32 are threaded through a support block 72. The blocks are preferably made of material which will not corrode, e.g., plastic. The blocks have gaskets 74 on their inner faces, and the quartz tubes 64, 66 extend between such gaskets. The quartz tubes are clamped in place, and to this end tie rods 76 extend through the blocks 72, 74, so that nuts on the ends of the tie rods can be tightened and thereby firmly clamp the ends of the quartz tubes between the gaskets 74. This arrangement, as is apparent, is illustrative of means to prevent leakage of water past the ends of the quartz tubes.

In addition to the unique arrangement for sterilizing the water passing through the quartz tubes 64, 66, the same ultraviolet radiation from the lamps 46 acts on the air entering the housing through the filters 42 to sterilize the air and produce ozone. Such ozone is directed into the top of the tank 18. Accordingly, an improved open system is provided wherein the upper end of the tank is not exposed to untreated air, but is exposed only to and protected by sterilized air, which contains ozone and to some extent ozonates the water by contact therewith for improved taste. As the water level lowers, such treated air is drawn into the tank. As the level rises, the treated air passes back through the filters to the exterior of the housing 24.

While the housing 24 is made airtight, so that air can enter only through the filters, it can be opened to permit ready removal and replacement of parts. Preferably the floor, ends and sides of the housing are made as an integral unit, as by welding metal parts together or bonding plastic parts together, and the top of the housing is removable. As best seen in FIG. 3, the inner surface of the top panel 26 is faced with a gasket strip 80, whereby to effect a positive airtight seal between the top panel and the top surfaces of the ends and sides of the housing on which the gasket 80 seats.

As will now be seen, the above construction is one which can readily be assembled and disassembled. With the top cover removed, the filter pads 42 are easily installed, and the lamp bases 44 are easily secured in place and the various electrical connections made. The subassembly of the quartz tubes 64, 66, the blocks 70, 72 and the tie rods 74 is made, and such subassembly is then lowered into the housing and held in position while the nipples 28, 30, 32, 34 are inserted through openings in the ends of the housing and threaded into the blocks 70, 72. Then the top cover 26 is sealed in place. Disassembly of the parts with the same ease is readily apparent.

In addition to the foregoing, I provide means to permit ready visual detection of failure of one or more of the lamps 46. To this end, a translucent disc 82 is inserted in an opening in a wall of the housing 24 and in such a position that it will be seen to glow while the lamps 46 are illuminated. Obviously the insert 82 may be placed in a sidewall or in the top cover 26.

With the ultraviolet lamps 46 connected in series, failure of one breaks the series connection, so that there will be no further illumination, whereby the interior of the housing will appear dark when one looks at the insert 82.

Other suitable means for making a visual inspection of lamp operation are of course embraced by my invention. For example, one wall of the housing may be made of translucent plastic, in which event such a translucent insert is not required.

From the foregoing, it will be apparent that various modifications can be made in the constructions illustrated and described without departing from the spirit and scope of my invention. Accordingly, I do not intend that my invention be limited, except in accordance with a reasonable interpretation of the appended claims.

I claim:

1. Water treatment apparatus comprising a membrane-type demineralizing unit for removing minerals from a stream of water, a first conduit through which water to be treated flows to said unit and having a wall adapted to pass ultraviolet radiation to said water, a second conduit through which demineralized water discharged from said unit flows and having a wall adapted to pass ultraviolet radiation to said demineralized water, a common ultraviolet source constructed and positioned to emit ultraviolet radiation through both of said walls and into both of said conduits to sterilize the water both upstream and downstream of said demineralizing unit, a housing containing said conduits and said ultraviolet source, inlet means for introducing air into said housing to a location of exposure to said radiation to form ozone in the air, a filter for removing impurities from the air entering said housing through said inlet means, a tank receiving demineralized and sterilized water from said second conduit, a third conduit for delivering air and ozone from said housing to said tank in a relation providing a blanket of sterilized air above the water in said tank, a check valve unit providing a one-way exhaust outlet from said tank at a predetermined level therein, and a valve controlled second outlet for withdrawing water from said tank, said tank and third conduit being sealed in a relation whereby withdrawal of water from the tank through said second outlet causes air to be drawn through said housing and third conduit into the tank by virtue of a drop in liquid level in the tank, whereas flow of an excessive amount of water into the tank first raises the liquid level and then causes discharge of the excess through said check valve.

2. Water treatment apparatus as recited in claim 1, in which said ultraviolet source includes a series of ultraviolet lamps in said housing, said first and second conduits being two quartz tubes at opposite sides of said lamps, said inlet means being apertures in a bottom wall of said housing, said filter including a pad of filtering material located on said bottom wall and above said apertures, there being two blocks at opposite ends of said first and second conduits clamped against said opposite ends and communicating with tubes leading to the exterior of the housing.

3. Water treatment apparatus comprising a membrane-type demineralizing unit for removing minerals from a stream of water, a first conduit through which water to be treated flows to said unit and having a wall adapted to pass ultraviolet radiation to said water, a second conduit through which demineralized water discharged from said unit flows and having a wall adapted to pass ultraviolet radiation to said demineralized water, a common ultraviolet source constructed and positioned to emit ultraviolet radiation through both of said walls and into both of said conduits to sterilize the water both upstream and downstream of said demineralizing unit, a housing structure containing said conduits and said ultraviolet source, means for introducing air into said housing to a location exposed to said ultraviolet radiation to sterilize the air, a tank receiving demineralized and sterilized water from said second conduit, and means for delivering air and ozone from said housing to said tank in a relation providing a blanket of sterilized air above the water in said tank.

4. Water treatment apparatus as recited in claim 3, including filter means positioned along the path of said air for removing impurities from the air.

5. Water treatment apparatus as recited in claim 3, in which said two conduits are two tubes formed of material essentially transparent to ultraviolet radiation and positioned at essentially opposite sides of said ultraviolet source.

6. Water treatment apparatus as recited in claim 3, including filter means positioned and constructed to remove impurities from air entering said housing.

7. Water treatment apparatus as recited in claim 3, including a valve controlled outlet for withdrawing water from said tank, said tank being sealed in a relation whereby withdrawal of water from the tank through said outlet causes air to be drawn through said housing and into the tank by virtue of a drop in liquid level in the tank.

8. Water treatment apparatus as recited in claim 3, including a check valve unit providing a one-way exhaust outlet from said tank at a predetermined level therein, and a valve controlled second outlet for withdrawing water from said tank, said tank being sealed in a relation whereby withdrawal of water from the tank through said second outlet causes air to be drawn through said housing and third conduit into the tank by virtue of a drop in liquid level in the tank, whereas flow of an excessive amount of water into the tank first raises the liquid level and then causes discharge of the excess through said check valve.

9. The combination comprising a housing, a first conduit within said housing for conducting a first stream of water through the housing and having a wall adapted to pass ultraviolet radiation to said water in the conduit, a second conduit within said housing for passing a second stream of water through the housing in isolation from the first stream and having a wall adapted to pass ultraviolet radiation to the water in the second conduit, a common ultraviolet source located in the housing and at the outside of both conduits and constructed and positioned to emit ultraviolet radiation through both of said walls and into both of said conduits to sterilize the water in both conduits, an inlet for introducing air into said housing to a location about said conduits and exposed to said radiation but isolated from both of said streams of water to sterilize the air, and an outlet for discharging said sterilized air from the housing separately from said water, said inlet being formed in a bottom wall of said housing, there being a filter pad on said bottom wall for removing impurities from air entering said inlet, said source being a series of ultraviolet lamps, said two conduits being two generally parallel quartz tubes at opposite sides of said lamps, there being a pair of blocks at opposite ends of said tubes and clamped thereagainst, and tubular fittings communicating with said quartz tubes at opposite ends thereof and extending from said blocks to the exterior of said housing.